UNITED STATES PATENT OFFICE.

LEZIAM L. PERRY, OF PEABODY, MASSACHUSETTS.

PROCESS OF MANUFACTURING TRANSPARENT FABRICS.

SPECIFICATION forming part of Letters Patent No. 420,696, dated February 4, 1890.

Application filed May 22, 1889. Serial No. 311,733. (No specimens.)

*To all whom it may concern:*

Be it known that I, LEZIAM L. PERRY, of Peabody, in the county of Essex and State of Massachusetts, have invented a new and useful Improvement in Processes of Manufacturing Transparent Fabrics, of which the following is a full, clear, and exact description.

This invention relates to the manufacture of transparent cloths or fabrics such as used for tracing and other purposes; and it consists in a novel process of giving to the fabric its necessary transparency and finish by subjecting it in succession, after being bleached, to certain sizing and chemical mixtures, together with other treatments and final glazing, substantially as hereinafter described, and pointed out in the claims, whereby a clear transparent cloth or fabric is produced having a superior elastic yield, and which may be handled without cracking. The fabric produced is more especially designed to be used as a tracing-cloth; but of course it may be used for any purpose for which it is suitable.

In carrying out my invention I first take the cloth to be treated, after the same has been bleached, and pass it through a size, to give it the necessary stiffness, composed of starch, borax, and water, preferably with an addition of lard—as, for instance, in the proportions of sixty pounds of starch, seven pounds of borax, thirty gallons of water, and ten pounds of lard, the borax being used to give increased clearness to the cloth. This first step in the process may be done by running the bleached cloth through any suitable sizing-machine or starch-mangle—such, for instance, as used in bleacheries—but using the special size above described. The sized cloth is then dried and afterward passed through a special mixture to give to it the required transparency and flexibility, and which may be done by running it through a starch-mangle, as above, only using, instead of size, a mixture substantially as follows: Take paraffine-wax in the proportion, say, of eight pounds and dissolve the same in one gallon of naphtha, one gallon of boiled linseed-oil mixed with one gallon of benzine heated to 90° Fahrenheit, and one quart of linseed-oil varnish mixed with one quart of turpentine heated to about 100° Fahrenheit. Then pour these several mixtures together into a tub or vessel to cool, after which the whole should be taken and boiled up with about thirty pounds of starch and thirty gallons of water. The object of using the naphtha, benzine, and turpentine is to dissolve the paraffine-wax, boil the linseed-oil, and linseed-oil varnish, the same being insoluble in water. The linseed-oil, varnish, and wax give to the cloth its required transparency, and these are worked into the cloth chemically by the aid of the naphtha, benzine, and turpentine, which afterward pass off in a gaseous state from the cloth during the drying of the latter—as, for instance, on an ordinary drying-can or otherwise. After the cloth has been passed through the mixture, as above, it is dried and afterward passed through an ordinary or any suitable dampening or degging machine to give it a proper moisture, after which it is calendered by passing it through an ordinary or any suitable calendering or glazing machine to give to the cloth its necessary finish.

If desired to give the cloth any special color, this may be done by mixing any suitable coloring-matter with the size in the first step of the process.

Having thus described my invention, what I claim as new, and desire to secure by Letters Patent, is—

1. The within-described process of making transparent cloth or fabric, which consists in first passing bleached cloth or fabric through a sizing-mixture to give it the necessary stiffness, and afterward through a mixture composed of paraffine-wax dissolved in naphtha, linseed-oil mixed with benzine, linseed-oil varnish mixed with turpentine and starch, and water, afterward drying and subsequently moistening the product, and finally calendering or glazing the fabric, as set forth.

2. The within-described process of making transparent cloth or fabric, which consists in first passing bleached cloth or fabric through a size composed of starch, borax, water, and lard, then drying the fabric, then passing it through a mixture composed of paraffine-wax dissolved in naphtha, boiled linseed-oil mixed with benzine, linseed-oil varnish mixed with turpentine and starch and water, then drying, then moistening, and subsequently calendering or glazing the fabric, as set forth.

LEZIAM L. PERRY.

Witnesses:
ANDREW COPPI,
PATRICK DALTON.